Feb. 6, 1951 G. T. SIGLER ET AL 2,540,382
NONSKID MECHANISM FOR MOTOR VEHICLES
Filed Feb. 25, 1949 2 Sheets-Sheet 1
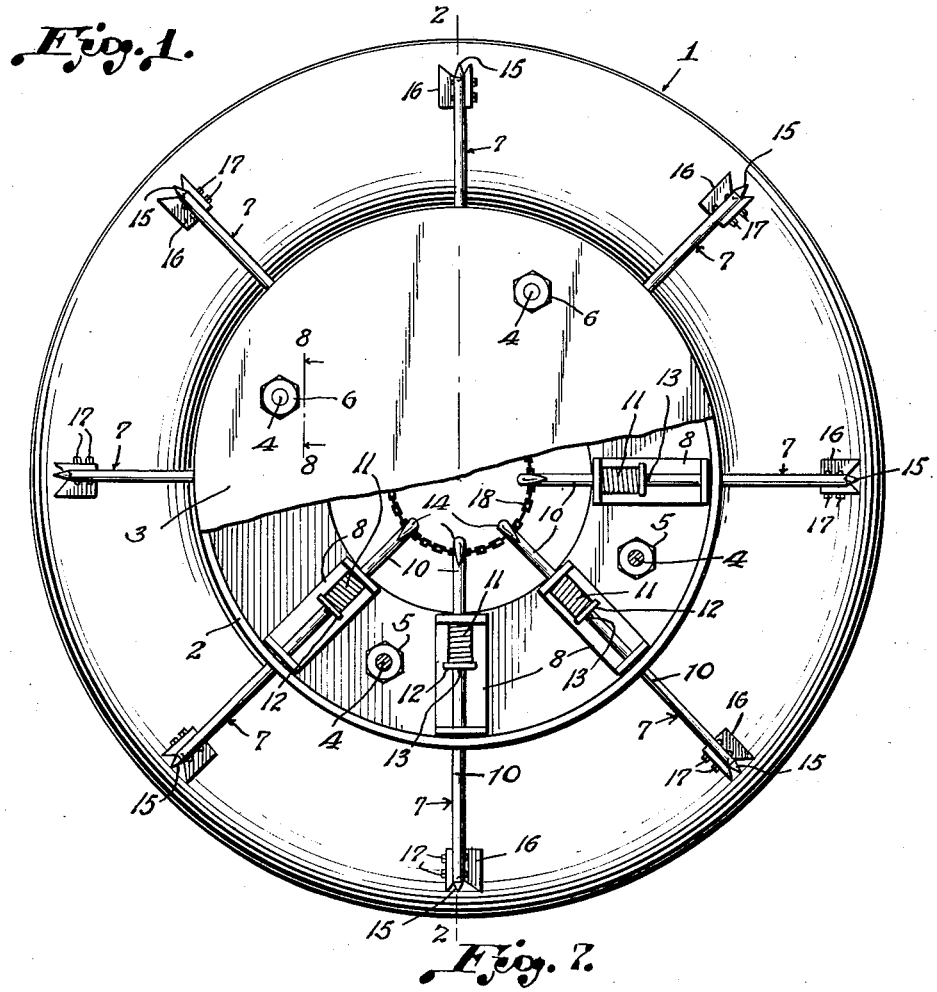
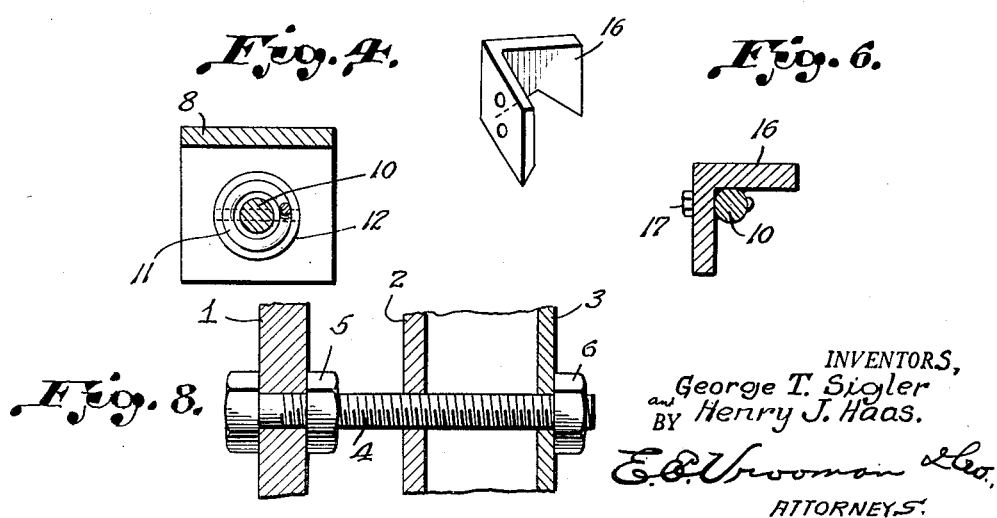
INVENTORS,
George T. Sigler
and Henry J. Haas.
BY
ATTORNEYS

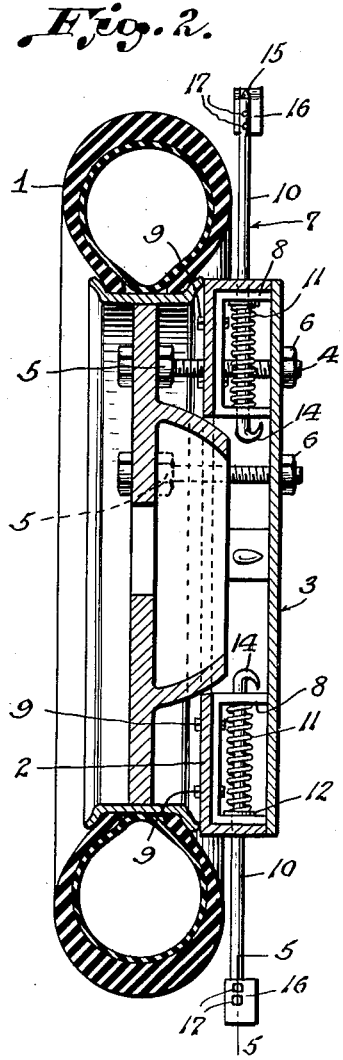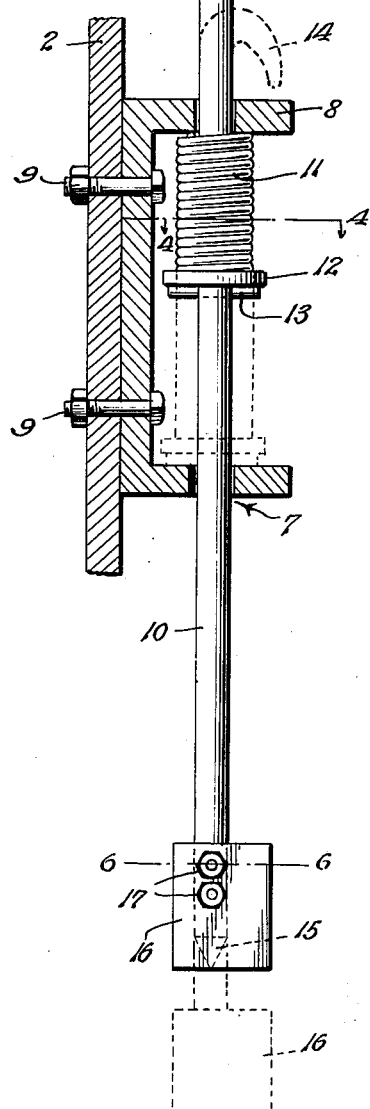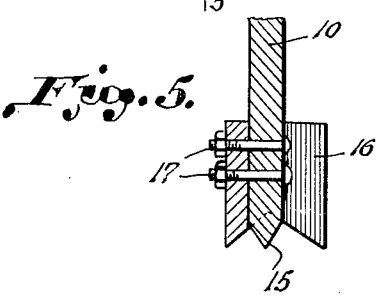

Patented Feb. 6, 1951

2,540,382

UNITED STATES PATENT OFFICE 2,540,382

NONSKID MECHANISM FOR MOTOR VEHICLES

George T. Sigler and Henry J. Haas, Martinsburg, W. Va.

Application February 25, 1949, Serial No. 78,316

3 Claims. (Cl. 301—47)

This invention relates to a non-skid mechanism for motor vehicles.

One of the objects of this invention is the provision of a mechanism to be attached to the wheels of a motor vehicle and left attached during the season of icy, or slippery roadways and highways.

Another object is the provision of an efficient mechanism that is not as cumbersome as anti-skid chains and which will be more positive in action.

A further object of the invention is the provision in an anti-skid mechanism of rod devices, whereby preferably eight points can contact the road during each revolution of the wheel, the rod devices being of such structure as will offer a general reciprocation.

A still further object of the invention is the provision of an efficient anti-skid mechanism which will result in the vehicle to which the mechanism is attached having a firm grip on the highway so that there will be no slipping of the wheel or wheels during a forward or backward motion, nor will there be any side skidding, or lateral movement of the equipped vehicle.

With the foregoing and other objects in view, this invention comprises certain novel constructions, combinations, and arrangements of parts as will be hereinafter fully described, illustrated in the accompanying drawings, and more particularly pointed out in the appended claims.

In the drawings:

Figure 1 is a view in side elevation of a motor vehicle wheel, showing our anti-skid mechanism applied thereto, the mechanism being in a retracted or inoperative condition.

Figure 2 is a transverse vertical sectional view, taken on line 2—2, Fig. 1.

Figure 3 is an enlarged fragmentary view, partly in section and partly in elevation, of one of the rod devices.

Figure 4 is a horizontal sectional view, taken on line 4—4, Fig. 3, and looking in the direction of the arrows.

Figure 5 is an enlarged sectional view, taken on line 5—5, Fig. 2.

Figure 6 is a horizontal sectional view, taken on line 6—6, Fig. 3.

Figure 7 is a perspective view of one of the angle grips.

Figure 8 is an enlarged sectional view, taken on line 8—8, Fig. 1, and looking in the direction of the arrows.

Referring to the drawings in which the preferred embodiment of this invention is illustrated, 1 designates an ordinary motor vehicle wheel to which this mechanism is attached.

The mechanism comprises a casing 2 that is provided with a cover 3. Primary bolts 4 extend through wheel 1, casing 2 and cover 3. Each bolt 4 has an inner nut 5 normally pressing against the automobile wheel 1, as clearly shown in Figure 2. These nuts 5 keep the bolts firmly in place upon the automobile wheel, thereby efficiently supporting the mechanism. The outer nuts 6 bear firmly against the outer face of the cover 3, holding said cover against accidental displacement.

There are preferably eight rod devices 7 on casing 2 and it will only be necessary to specifically describe one of these rod devices 7, as they are all alike. The rod device 7 includes a U-shaped bracket 8, Fig. 3, which is securely fastened to casing 2, preferably by bolts 9. Bolts 9 will hereinafter be referred to as the auxiliary bolts, while bolts 4 are the primary bolts. A slidable rod 10 is mounted on bracket 8. This rod has a strong steel coil spring 11 mounted thereon. Spring 11 bears at its upper end against bracket 8, while its lower end engages a disc 12, which disc is held in place by pin 13; pin 13 is mounted on rod 10. The inner end of rod 10 is provided with a hook 14. On the outer end of rod 10 is preferably formed a point 15, Fig. 5. An angle grip 16 is preferably fastened by bolts 17 to the outer end of rod 10. Angle grip 16 and point 15 produce admirable means for gripping slippery or icy pavements or roadways.

When all of the rod devices 7 are assembled as shown in Fig. 1, by drawing or forcing inwardly the rods 10, a retaining chain 18, Fig. 1, is placed on the hooks 14, whereby the rod devices are held in an inoperative position. Then when the operator needs the efficient anti-skid mechanism, for preventing skidding or slipping, all that is necessary is to remove the cover 3, quickly unhook or unfasten the retaining chain 18 from hooks 14, whereupon the rods 10 will extend as shown in Fig. 2 for the desired results.

By reason of the stable positioning of the primary bolts 4, as hereinbefore described, the casing 2 and its parts is securely held in position, even when the nuts 6 and cover 3 are removed, during the positioning of the rod devices 7, as shown in Fig. 1, or when releasing the hook ends of the rods 10, by removing chain 18, for allowing the non-skid mechanism to operate as described.

The entire mechanism is compact and efficient, since it can be easily attached to a motor vehicle wheel and is out of the way when not in use, and can be placed into use with a comparatively simple operation.

While we have described the preferred embodiment of our invention and illustrated the same in the accompanying drawings, certain minor changes or alterations may appear to one skilled in the art to which this invention relates during the extensive manufacture of the same, and we, therefore, reserve the right to make such changes or alterations as shall fairly fall within the scope of the appended claims.

What we claim is:

1. In a mechanism of the class described, the combination with a casing, of a plurality of rod devices on said casing, each rod device comprising a U-shaped bracket fixedly secured to the inner face of said casing, a rod slidably mounted on said U-shaped bracket, said rod provided with spring engaging means, a coil spring on said rod and bearing against said spring engaging means and also against a portion of said U-shaped bracket, said rod provided on its inner end with an integral hook, and a retaining chain being adapted to engage all of the hooks of said rod devices for holding the rods in an inoperative position.

2. In a mechanism of the class described, the combination with a wheel, of primary bolts extending through portions of said wheel, nuts on said primary bolts against said wheel, a casing on said primary bolts against said wheel, a plurality of rod devices on said casing, each rod device comprising vertically positioned U-shaped brackets fastened to the inner face of said casing, a slidable rod on the U-shaped bracket, a coil spring on said rod within said U-shaped bracket, said rod provided with a chain receiving hook on its inner end, a chain mounted on all of the chain receiving hooks, and a cover on said primary bolts against said casing.

3. In a mechanism of the class described, the combination of a casing, rod devices mounted on said casing, each rod device including a rod provided on its inner end with a hook and on its outer end with a double grip, and a flexible, readily detachable retaining means mounted on and within said hooks of said rod devices.

GEORGE T. SIGLER.
HENRY J. HAAS.

REFERENCES CITED

The following references are of record in the file of this patent:

UNITED STATES PATENTS

| Number | Name | Date |
| --- | --- | --- |
| 1,236,109 | Rose | Aug. 7, 1917 |
| 1,890,872 | Van Kleeck | Dec. 13, 1932 |
| 1,894,003 | Prange | Jan. 10, 1933 |

FOREIGN PATENTS

| Number | Country | Date |
| --- | --- | --- |
| 194,322 | Switzerland | Nov. 30, 1937 |